United States Patent
Winner et al.

(10) Patent No.: US 6,879,901 B2
(45) Date of Patent: Apr. 12, 2005

(54) METHOD FOR REGULATING THE SPEED OF A VEHICLE

(75) Inventors: Hermann Winner, Karlsruhe (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 740 days.

(21) Appl. No.: 09/834,331

(22) Filed: Apr. 12, 2001

(65) Prior Publication Data

US 2004/0119632 A1 Jun. 24, 2004

(30) Foreign Application Priority Data

Apr. 14, 2000 (DE) .......................................... 100 18 554

(51) Int. Cl.⁷ ................................................ B62D 6/00
(52) U.S. Cl. ............................ 701/93; 701/28; 701/96; 701/300; 342/71; 340/436; 180/167; 180/170
(58) Field of Search .............................. 701/93, 28, 96, 701/300; 348/113, 118, 119; 342/70, 71; 340/435, 436; 180/167, 169, 170

(56) References Cited

U.S. PATENT DOCUMENTS 5,161,632 A * 11/1992 Asayama .................... 180/167
5,761,629 A * 6/1998 Gilling ......................... 701/96
5,929,785 A * 7/1999 Satonaka ...................... 340/903
5,955,941 A * 9/1999 Pruksch et al. .............. 340/435
6,081,762 A * 6/2000 Richardson et al. ........... 701/93
6,094,616 A * 7/2000 Andreas et al. ................ 701/96
6,256,574 B1 * 7/2001 Prestl et al. ................... 701/96

FOREIGN PATENT DOCUMENTS

| DE | 42 42 700 | 6/1994 |
| DE | 195 30 065 | 1/1997 |
| EP | 0 716 949 | 6/1996 |

\* cited by examiner

Primary Examiner—Thomas G. Black
Assistant Examiner—Eric M. Gibson
(74) Attorney, Agent, or Firm—Kenyon & Kenyon

(57) ABSTRACT

A method for regulating the speed of a vehicle, in which at least one vehicle traveling ahead is detected by a radar sensor within a radar detection range. An acceleration limitation is carried out in the vehicle to be regulated, when a vehicle moves, at lower speed than the vehicle to be regulated, in a neighboring lane provided for vehicles traveling at higher speed. The magnitude of the acceleration limitation is a function of the distance of the vehicle in the neighboring lane from the vehicle which is to be regulated, and of its speed with respect to the vehicle which is to be regulated.

7 Claims, 1 Drawing Sheet

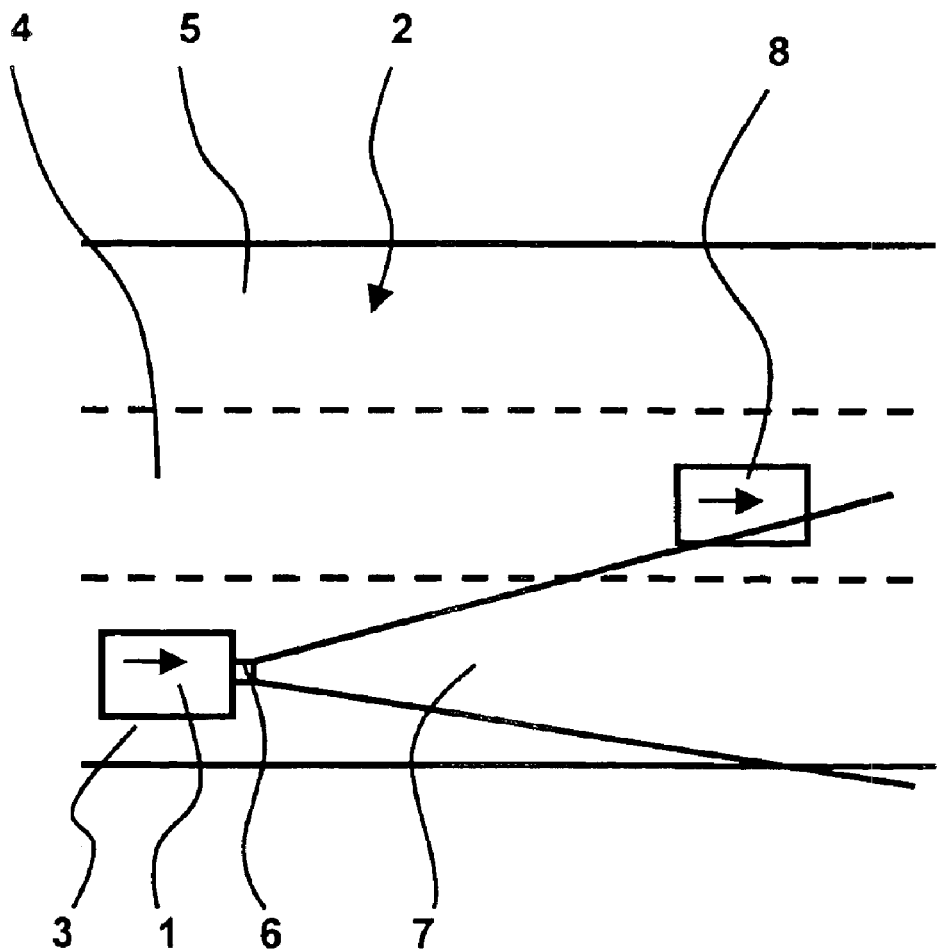
Figure

METHOD FOR REGULATING THE SPEED OF A VEHICLE

FIELD OF THE INVENTION

The present invention relates to a method for regulating the speed of a vehicle, particularly with respect to vehicles traveling ahead.

BACKGROUND INFORMATION

A distance sensor positioned on a vehicle for registering vehicles traveling ahead is described in German Patent No. 42 42 700, working, for example, on a radar or infrared basis. The radar sensor can be, for example, a building block of a vehicle luxury system ACC (adaptive cruise control), in which data about the distance from, and the relative speed to other vehicles and concerning road conditions are constantly processed. In a manner known from German Patent No. 195 30 065, for example, an FMCW (frequency modulated continuous wave) radar is attached to the front area of the motor vehicle, and has both the transmitting technology with an antenna system for generating radar beams and a receiver having the evaluation electronics. According to German Patent No. 195 30 065, lateral ascertaining of the position of objects can also be carried out by a multi-beam method.

The speed regulation in an ACC system mentioned at the beginning is done in such a way that the regulation is based on either a setpoint value, i.e. a desired speed, or on the speed of a vehicle traveling ahead, in case the latter is slower than the desired speed, and this vehicle is within detection range of the radar sensor. It can happen here that, even using the ACC system, in the case of right-hand drive traffic, a vehicle may pass improperly on the right. This happens when no target vehicle is present in the right lane that is going faster than a vehicle to the left, or, if it is going at the same speed, it is still at a great distance from the vehicle having the ACC system.

In European Patent No. 0 716 949, for example, in a speed regulation for a motor vehicle, consideration is taken in the regulation of the closest vehicle which is in a faster lane, i.e., in the lane to the left, in right-hand drive traffic. This vehicle then becomes an object of regulation if it goes slower than the target object in one's own lane, or when no target object is present in one's own lane. What is disadvantageous here is that, in a spontaneous great delay in the traffic in the neighboring lane, the vehicle having the ACC system also has its speed braked down strongly.

SUMMARY OF THE INVENTION

A method for regulating the speed of a vehicle, in which at least one vehicle traveling ahead within radar detection range is detected by a radar sensor, is provided according to the present invention. In a simple manner, an acceleration limitation is carried out, in the vehicle to be regulated, when a vehicle moves at lower speed than the vehicle to be regulated, in a neighboring lane provided for vehicles going at higher speed.

For this, it is preferred that the magnitude of the acceleration limitation is a function of the distance of the vehicle in the neighboring lane from the vehicle to be regulated, and of its speed relative to the vehicle to be regulated. Here, for example, advantageously, a limiting value for the acceleration can have a value of zero or a negative value corresponding to a drag delay, when the vehicle is at a small or medium distance from the vehicle to be regulated. In the case where the vehicle is at a greater distance, the limiting value of the acceleration should be positive.

In this connection, the limiting value with regard to a drag delay amounts to approximately $-0.5$ m/s$^2$ at a small to medium distance of approximately 5 to 60 m, and the limiting value at a greater distance of approximately $+0.1$ to $0.25$ m/s$^2$, so as to preclude the possibility of a rear-end collision at great speed with the vehicle ahead.

Thus, the present invention advantageously achieves an adaptive acceleration limitation, instead of a fixed consideration of the vehicles in the neighboring lane, known from the related art. Depending on the distance and the speed of the vehicle traveling in the faster neighboring lane, and on one's own driving speed, that limiting value for acceleration is fixed, which limits the regulator setpoint value in the ACC vehicle. Therefore, it is guaranteed in an advantageous way that, in the case of a slower vehicle traveling in a lane essentially reserved for faster vehicles, a moderate reaction follows, for instance, that only the throttle is cut back and the vehicle is slowed down by drag torque.

Thus, according to the present invention, there is no firm control coupling to a vehicle in the normally faster lane, and one can get an average value by using a plurality of vehicles in the faster lane to determine the limit value. Thus, there is no dependence on individual objects in the faster lane, since regulation is not derived from these, but they only modify the standard regulation, existing in the regulated vehicle, by the acceleration limits. The method according to the present invention therefore permits an appropriate reaction to the traffic flow in the faster lane.

Since passing on the right is permitted in cities and on some superhighways at a travel speed below 60 km/h, it makes sense to raise the limiting values at low speeds, and particularly, not to form limiting values with negative accelerations below 60 km/h.

Since people on the European continent in right-hand drive traffic drive in the left, faster lane, and in the British Isles, for instance, in left-hand drive traffic drive in the right, faster lane, it is advantageous to arrange for right/left traffic recognition. This function is codable, for example, during a diagnosis at the production of the vehicle, or in a repair shop.

If the condition for the acceleration limitation has been lifted, the limitation can also be lifted more slowly. In this connection, then, the acceleration limit rises with a time delay. Furthermore, in an advantageous manner, a delayed beginning can be introduced as a jolt-reduced application of the acceleration limits.

BRIEF DESCRIPTION OF THE DRAWING

The FIGURE illustrates the method according to the present invention for regulation of the speed of a vehicle with respect to a vehicle traveling ahead in a neighboring lane reserved for normally faster vehicles.

DETAILED DESCRIPTION

The FIGURE shows an ACC vehicle 1 to be regulated, which is located on a highway 2 with lanes 3, 4 and 5. The vehicle 1 has a radar sensor 6 having a radar sensing range 7. On the highway 2 a vehicle 8 is present in the neighboring left side lane 4, a lane normally reserved for faster moving vehicles in countries with right-hand drive, but here the vehicle travels at a lower speed than vehicle 1 which has the ACC system.

This ACC system in vehicle 1 contains a regulating device for influencing the speed, an acceleration limitation being effected by it, which is dependent on the distance of vehicle 8 in neighboring lane 4, and on its speed relative to vehicle 1 which is to be regulated. The magnitudes required to do this are ascertained by radar sensor 6 in a manner generally known from the related art.

In order not to support passing on the right, e.g. when exceeding a minimum speed of 60 km/h, a limiting value for the acceleration of vehicle 1 can have the value zero, or a negative value (e.g. −0.5 m/s$^2$), corresponding to a drag delay, when vehicle 8 is at a small or medium distance (for example, approximately 5 to 60 m) from vehicle 1 which is to be regulated. In the case where the vehicle is at a distance greater than, for example, approximately 60 m, the limiting value of the acceleration should be positive (e.g. +0.1 to +0.25 m/s$^2$).

What is claimed is:

1. A method for controlling a speed of a vehicle to be regulated, comprising:

detecting at least one vehicle traveling ahead within a radar detection range using a radar sensor of the vehicle to be regulated;

undertaking an acceleration limitation in the vehicle to be regulated when, in a neighboring lane provided for vehicles having greater travel speed, a vehicle is moving at a lower speed than the vehicle to be regulated; and lifting the acceleration limitation more slowly in response to a change in conditions for the acceleration limitation, an acceleration limit increasing in a time-delayed manner.

2. The method according to claim 1, wherein a magnitude of the acceleration limitation is a function of a distance of the vehicle in the neighboring lane from the vehicle to be regulated and of a speed of the vehicle in the neighboring lane with respect to the vehicle to be regulated.

3. The method according to claim 1, wherein the acceleration limitation of the vehicle to be regulated takes effect only above a predefined minimum speed.

4. The method according to claim 1, wherein the neighboring lane is a left-side lane.

5. The method according to claim 1, wherein the neighboring lane is a right-side lane.

6. A method for controlling a speed of a vehicle to be regulated, comprising:

detecting at least one vehicle traveling ahead within a radar detection range using a radar sensor of the vehicle to be regulated; and undertaking an acceleration limitation in the vehicle to be regulated when, in a neighboring lane provided for vehicles having greater travel speed, a vehicle is moving at a lower speed than the vehicle to be regulated;

wherein a limiting value of the acceleration limitation has one of a zero value and a negative value corresponding to a drag delay when the vehicle in the neighboring lane is at one of a small distance and a medium distance from the vehicle to be regulated, and wherein the limiting value has a positive value when the vehicle to be regulated is at a greater distance.

7. The method according to claim 6, wherein the negative value is about −0.5 m/s$^2$ at a distance of about 5 to 60 m, and the positive value is about −0.1 to +0.25 m/s$^2$.

* * * * *